(12) United States Patent
Araki et al.

(10) Patent No.: US 8,107,061 B2
(45) Date of Patent: Jan. 31, 2012

(54) ACOUSTIC MEASUREMENT DEVICE AND ACOUSTIC MEASUREMENT METHOD

(75) Inventors: Mikiya Araki, Gunma (JP); Yusuke Sone, Gunma (JP); Takayuki Kojima, Tokyo (JP); Hideyuki Taguchi, Tokyo (JP); Seiichi Shiga, Gunma (JP); Tomio Obokata, Gunma (JP)

(73) Assignees: National University Corporation Gunma University, Gunma (JP); Japan Aerospace Exploration Agency, Tokyo (JP)

( * ) Notice: Subject to any disclaimer, the term of this patent is extended or adjusted under 35 U.S.C. 154(b) by 255 days.

(21) Appl. No.: 12/684,127

(22) Filed: Jan. 8, 2010

(65) Prior Publication Data

US 2010/0162819 A1 Jul. 1, 2010

Related U.S. Application Data

(63) Continuation of application No. PCT/JP2008/062485, filed on Jul. 10, 2008.

(30) Foreign Application Priority Data

Jul. 10, 2007 (JP) ................................. 2007-181146

(51) Int. Cl.
*G01N 21/41* (2006.01)
(52) U.S. Cl. ........................ 356/129; 73/112.01; 73/655
(58) Field of Classification Search ............... 73/112.01, 73/655; 356/128, 129
See application file for complete search history.

(56) References Cited

U.S. PATENT DOCUMENTS 3,623,361 A * 11/1971 Funk .............................. 73/147
4,547,071 A * 10/1985 Teitelbaum ................... 356/344

FOREIGN PATENT DOCUMENTS

JP 2-290959 11/1990

OTHER PUBLICATIONS

G. Raman, Supersonic Jet Screech: Half-Century From Powell to the Present, Journal of Sound and Vibration, 1999, pp. 543 to 571, 225 (3), Academic Press.
Alan Powell et al. Observations of the oscillation modes of choked circular jets, J. Acoust. Soc. Am., Nov. 1992, pp. 2823 to 2836, 92 (5), Acoustical Society of America.

(Continued)

*Primary Examiner* — John Chapman, Jr.
(74) *Attorney, Agent, or Firm* — Ditthavong Mori & Steiner, P.C.

(57) ABSTRACT

In a schlieren optical system, a laser beam is passed through the jet flow and the ambient around the jet flow, and a high speed sampling is performed using a high speed photo sensor while displacing measurement points. The value obtained by sampling represents a result of the optical path caused curved by a density gradient generated in an arc-shape from the center of the jet flow. The value is subjected to a high speed discrete Fourier transform and decomposed into frequency components which constitute the noise. Thereafter, Abel inversion is performed on data belonging to a particular frequency to obtain a density gradient in the radial direction from the center of the jet flow. The obtained density gradient is visualized in a graph display, so that the position of the sound source and the state of the jet flow can be accurately grasped.

6 Claims, 9 Drawing Sheets

OTHER PUBLICATIONS

Yoshikuni Umeda et al. Sound sources of screech tone radiated from circular supersonic jet oscillating in the helical mode, International journal of aeroacoustics, 2002, pp. 355 to 384, vol. 1, No. 4, Multi-science publishing co. ltd., Essex, UK.

K. K. Ahuja et al. Shear Flow Control by Mechanical Tabs, AIAA-89-0994, 1989, American Institute of Aeronautics and Astronautics, Washington, D.C.

M. Samimy et al. Effect of Tabs on the Flow and Noise Field of an Axisymmetric Jet, AIAA Journal, Apr. 1993, pp. 609 to 619, vol. 31, No. 4, American Institute of Aeronautics and Astronautics, Washington, D.C.

Hiroshi Kobayashi et al. Supersonic Jet Noise Reduction Performance and Noise Reduction Mechanism of Tab Jet Noise Suppresser, ASME NCA, Acoustic Radiation and Wave Propagation, 1994, pp. 149 to 163, vol. 17.

Eisuke Outa et al. Computational Study of Supersonic Free Propulsion Jet related with Screeching and Screech-Free Flow Structures, Proceeding of the 16th Int. Symposium on Airbreathing Engines, 2003, CD-Rom American Institute of Aeronautics and Astronautics, Washington, D.C.

Mikiya Araki et al. Noise Reduction of a Supersonic Jet Using Gas Injection from a Nozzle Wall, Journal of the Japan Society of Mechanical Engineers (B), 2005, pp. 1798 to 1805, vol. 71, No. 707(Jul. 2005).

Mikiya Araki et al. Effects of Aerodynamic Tabs on Screech Reduction of a Supersonic Jet, AIAA Journal, 2006, pp. 408-411, vol. 44, No. 2: Technical notes, American Institute of Aeronautics and Astronautics, Washington, D.C.

Mikiya Araki et al. Noise Reduction Performance of Aerodynamic Tabs in a Supersonic Jet, Journal of the Japan Society of Mechanical Engineers (B), 2007, pp. 567 to 574, vol. 73, No. 726(Feb. 2007).

H. Suda et al. Transition of Oscillation Modes of Rectangular Supersonic Jet in Screech, AIAA-93-4323, 1993, American Institute of Aeronautics and Astronautics, Washington, D.C.

Shadowgraph method, 1977, pp. 328 to 341.

Akira Yaoita Numerical computation method for the Abel Inversion, The circulars of the electrotechnical laboratory, Dec. 1971, pp. 1 to 32, No. 172.

Kosaka et al., "Veteran to Rookie Laser-ko ni yoru Ryutai Soon Sokutei", Valve Technical Review, Mar. 31, 2007, pp. 59 to 61, vol. 22, No. 1.

* cited by examiner

8192 SAMPLES

ACOUSTIC MEASUREMENT DEVICE AND ACOUSTIC MEASUREMENT METHOD

CROSS REFERENCES TO RELATED APPLICATIONS

The present invention contains subject matter related to Japanese Patent Application JP 2007-181146 filed in the Japanese Patent Office on Jul. 10, 2007, the entire contents of which being incorporated herein by reference.

BACKGROUND OF THE INVENTION

1. Field of the Invention

The present invention relates to a technique preferably applied to an acoustic measurement method.

More particularly, the present invention relates to a technique for non-intrusively measuring noise caused by a jet flow.

2. Description of the Related Art

In the development of the next generation's supersonic transport, reduction of the noise caused by the exhaust of a jet engine (also called "jet noise") is one of the most important problems. The jet flow of the jet engine is sheared off from the ambient atmosphere, so that a strong turbulence is generated in a boundary region (called a "shear layer" or "mixing layer") between the jet and the ambient atmosphere. In the case where the jet flow is a supersonic jet, for example, a screech (The word "screech" means a sharp piercing cry, also means a very intensive noise having a particular frequency. In the aviation industry and the like, the aforesaid jet noise is referred to as a "jet screech" or simply a "screech") will be caused due to the turbulence generated in the boundary region. Further, along with the screech, a broadband noise appears which includes sounds at various frequencies. Since the screech is caused because a large amount of energy is concentrated in a very narrow frequency band, the screech becomes a serious problem which not only leads to noise pollution, but also leads to damage of the framework of the vehicle (see Raman, G., J. Sound and Vibration, 225-3 (1999), 543-571).

Various efforts are being made in order to reduce the noise such as the jet screech and the broadband noise. These efforts include: conducting a jet flow analysis (see Powell, A. et al., J. Acoust. Soc. Am., 92-5 (1992), 2823-2836; and Umeda, Y. and Ishii, R., Int. J. Aeroacoustics, 1-4 (2002), 355-384), developing a method for reducing the screech by providing projections (also called "tabs") on the nozzle exit of the jet engine (see Ahuja, K. K. and Brown, W. H., AIAA paper 89-0994; Samimy, M. et al., AIAA Journal, 31-4 (1993), 609-619; and Kobayashi, H. et al., ASME NCA, Acoustic Radiation and Wave Propagation, 17 (1994), 149-163), developing a method for reducing the screech by providing aerodynamic tabs which inject small gas jets from the nozzle wall, instead of mechanical tabs (see Araki, M. et al., JSME Journal (Series B), 71-707, B (2005), 1798-1805; Araki, M. et al., AIAA Journal, 44-2 (2006), pp. 408-411; and Araki, M. et al., JSME Journal (Series B), 73-726, B (2007), 567-574).

SUMMARY OF THE INVENTION

In order to develop a device for reducing the noise caused by the jet flow of the jet engine without reducing the thrust of the jet engine, it is necessary to precisely know the location and the intensity of the source of the noise. It is obvious that a tool can not be created for reducing the noise if the location of the noise is not identified.

It would be ideal if a device such as the aforesaid aerodynamic tabs for reducing the noise is created in a manner in which the behavior of the source of the noise and the effects thereof can be directly visualized. However, in the case of a jet noise such as a screech and/or a broadband noise, the source of the noise exists inside the jet flow. Thus, it is difficult to measure the noise using an intrusive method such as a microphone, because the jet will be blocked by a wind noise caused when the jet interferes with the microphone.

In view of the aforesaid problems, an object of the present invention is to provide a method for accurately measuring the noise caused by the jet flow of a jet engine in a wide speed ranged from subsonic to supersonic in a non-intrusive manner, as well as a measurement device for implementing the method.

To solve the aforesaid problems, in an acoustic measurement device according to an aspect of the present invention, an optical system is employed, and a light beam is passed through a jet flow. The brightness of the light beam is converted into an electrical signal, and the electrical signal is subjected to a sampling process at a predetermined sampling frequency using an interface so as to be converted into digital brightness data.

The obtained brightness data is once stored as data associated with measurement position information of brightness fluctuation of the laser beam, and then converted into frequency component information and amplitude data by a Fourier transform section.

The frequency component information and amplitude data are once stored as data associated with measurement position information and then, after amplitude data of a desired frequency is selected by an analysis frequency selecting section, converted by an Abel inversion section into density gradient information of the jet flow at a radial position from the center of the jet flow.

The density gradient information of the jet flow at a radial position from the center of the jet flow is once stored, and then is subjected to a visualization processing in a display processing section and a display.

However, when measuring the brightness fluctuation of the light passed through the jet flow of the jet engine, the speed of a device such as a CCD camera is not high enough to follow the measurement. To solve this problem, a high speed photo sensor is employed to perform sampling process on the brightness signal to obtain brightness data. The brightness data is subjected to frequency expansion, and then the Abel inversion is performed on the amplitude data at a desired frequency component.

According to the present invention, it is possible to provide an acoustic measurement device and an acoustic measurement method capable of accurately measuring the noise caused by the jet flow of a jet engine having a speed ranged from subsonic to supersonic in a non-intrusive manner and, in regard to noise analysis of the supersonic jet, capable of accurately performing noise analysis for a particular component of the noise.

DETAILED DESCRIPTION OF THE PREFERRED EMBODIMENT(S)

An embodiment of the present invention will be described below with reference to FIGS. 1 to 10.

Figure 1:
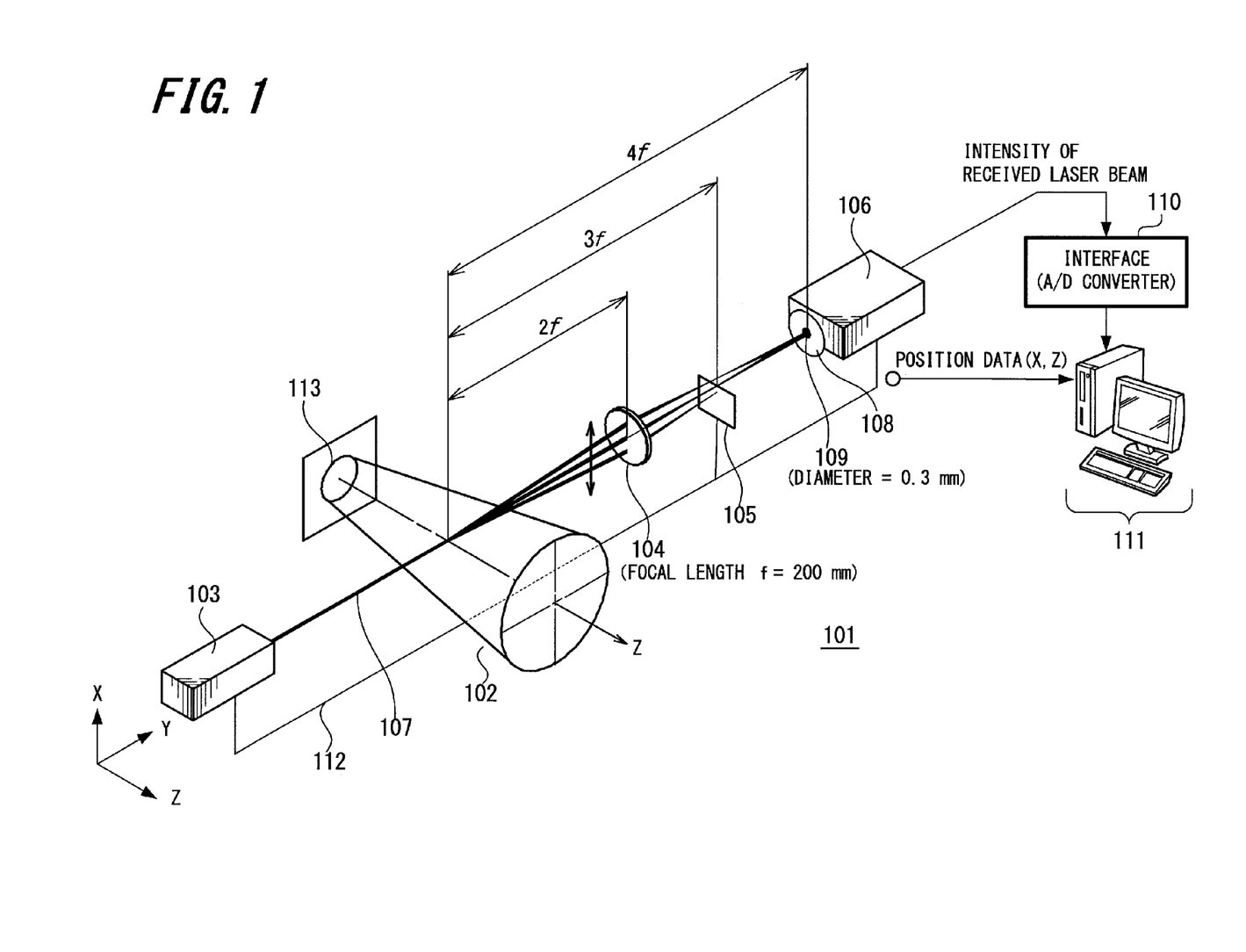
FIG. 1 is a schematic view showing a supersonic acoustic measurement system according to an embodiment of the present invention.

FIG. 1 is a schematic view showing a supersonic jet acoustic measurement system (referred to as a "measurement system" hereinafter) 101 according to the embodiment of the present invention.

A sound travelling through a gas is a fluctuation of the pressure of the gas, and is at the same time a density fluctuation.

The measurement system 101 is a system in which, in a schlieren optical system, a light beam is passed through a jet flow (i.e., a gas) of a jet engine, the brightness of the light is measured to obtain data of brightness fluctuation, the obtained data of brightness fluctuation is converted into a density gradient (i.e., a density fluctuation (a noise)) of the jet flow, and thereby the noise caused by the jet flow of the jet engine (i.e., the density fluctuation of the jet flow) is measured.

The measurement system 101 includes an optical system arranged near the supersonic jet 102 whose acoustic radiation is to be measured and a data processing system, the optical system being adapted to measure the brightness fluctuation of the light beam passed through the jet 102, and the data processing system being adapted to convert the brightness fluctuation value measured by the optical system into the density fluctuation value of the jet 102.

The optical system shown in FIG. 1 includes a laser head 103 that emits a laser beam 107, a convex lens 104 (also called a "converging section"), a knife edge 105 for shielding a part of the laser beam 107, and a photo sensor 106. These components constitute a schlieren optical system which uses the laser beam 107. The schlieren optical system detects the density fluctuation of the jet 102.

Figure 2:
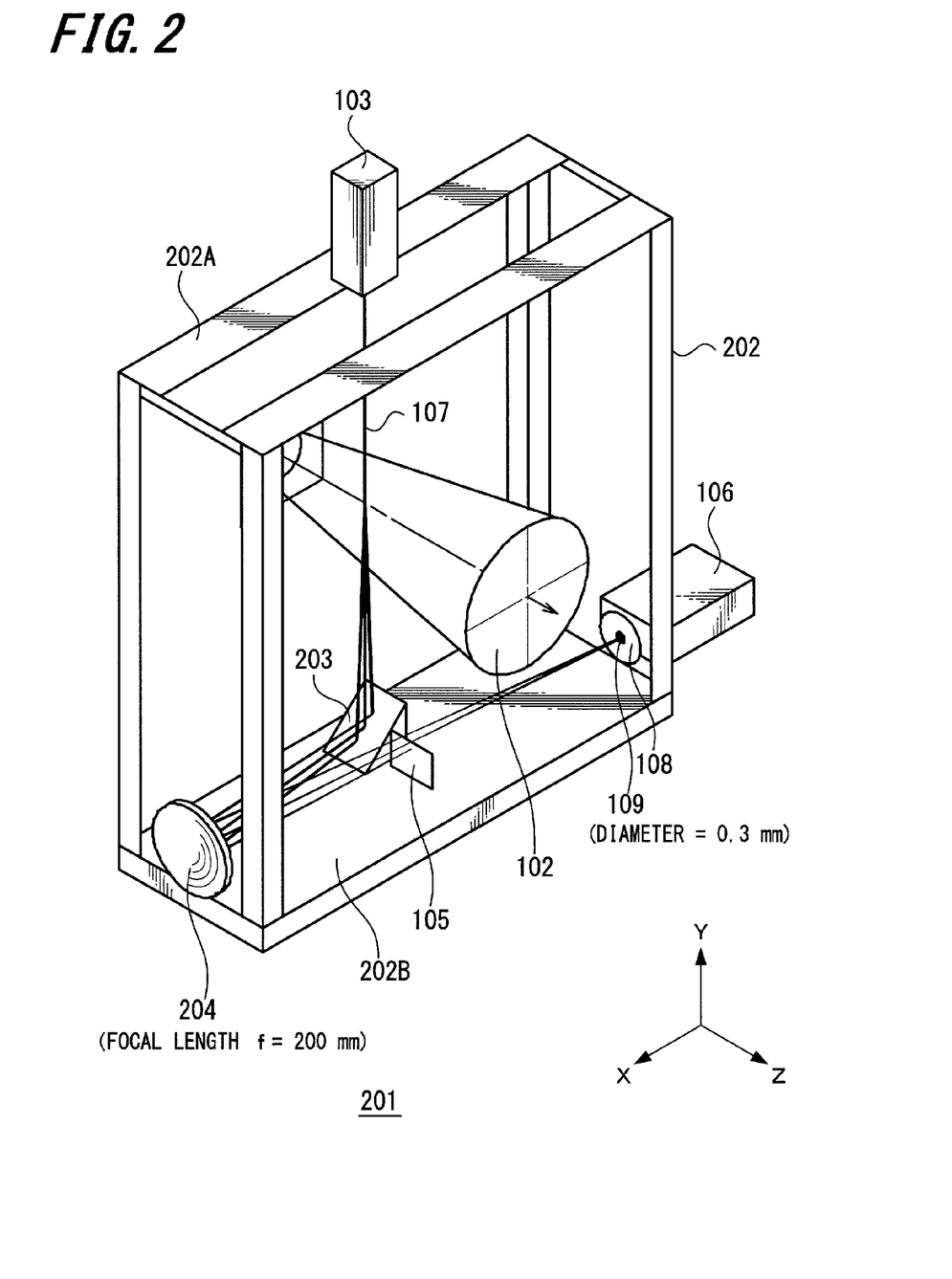
FIG. 2 is a schematic view showing a supersonic acoustic measurement probe actually used in an experiment.

As shown in FIG. 2, in an optical system used in an actual experiment, the optical path of the optical system is folded with a concave mirror 204 for convenience of placement. In FIG. 1, the optical path is equivalently extended in a straight line for simplicity.

The laser head 103 is a He—Ne laser device. However, the laser head is not limited to the He—Ne laser device but may be other laser devices as long as a parallel light beam can be outputted. For example, the laser head may also be a general semiconductor laser used in an optical disk device. The optical system actually used in the experiment is a CW He—Ne laser (Sigma Optics, 05-LHR-151). The wavelength is 632.8 nm. The diameter of the laser beam 107 is about 0.8 mm.

In the experiment, the laser beam 107 emitted from the laser head 103 is passed through the supersonic jet 102 or the ambient around the supersonic jet 102.

The convex lens 104 is adapted to converge the laser beam 107. The convex lens 104 (note: a concave mirror 204 is used in the experiment) whose focal length is 200 mm (i.e., f=200 mm) is set at 400 mm from the central axis of the supersonic jet 102 after passing through the supersonic jet 102. The focal point of the laser beam 107 is located at 200 mm from the convex lens 104 after passing through the convex lens 104. The focal length of the convex lens 104 is not limited to 200 mm (i.e., f=200 mm), but may be suitably changed according to the required sensitivity.

The laser beam 107 is refracted either due to the density gradient of the supersonic jet 102 exists in the optical path, or due to the density gradient caused by the sound wave generated by the supersonic jet 102. The refraction principle of the laser beam 107 is similar to a mirage. In other words, the laser beam 107 is refracted due to variation of the refractive index caused by the density difference (i.e., the density gradient) of the jet. The variation of the refractive index of the supersonic jet 102 is observed as variation of a refraction angle of the laser beam 107. When the laser beam 107 is refracted, the focal position moves. Since the density gradient of the jet 102 is not in a constant state, the focal position of the laser beam 107 oscillates periodically. It seems like the laser beam 107 plays a role just like a needle of a record player. The details of the refraction principle will be described later with reference to FIG. 5.

The focal position of the laser beam 107 moves in an X-Z plane shown in FIG. 1. Since the convex lens 104 does not move, the distance between the laser head 103 and the focal point in Y-axis direction does not change.

The knife edge 105 is set at a position so that, in an X-Z plane in which the focal point is located if the laser beam 107 is not refracted, about half of the focal point (i.e., the beam spot) is hidden.

By setting the knife edge 105 in the optical path of the laser beam 107 in the aforesaid manner, the movement of the focal point of the laser beam 107 due to the variation of the refraction angle of the laser beam 107 caused by the supersonic jet 102 disposed in the optical path of the laser beam 107 can be observed as variation of the brightness of the laser beam 107.

The laser beam 107 whose brightness varies is received by the photo sensor 106, in which the received laser beam is converted into an electrical signal (a brightness signal).

Incidentally, the laser beam 107 is refracted toward the same direction as the direction of the density gradient (i.e., the direction in which the density becomes higher).

The knife edge 105 may also be arranged in a vertical direction or an oblique direction with respect to the beam spot as long as the knife edge 105 is set at a position so that half of the beam spot formed in the X-Z plane, in which the focal point of the laser beam 107 is located, is hidden. In other words, direction of the detected density fluctuation (i.e., directionality) can be selected by changing the setting direction of the knife edge 105. Further, it is possible to detect the density fluctuation (the sound wave) in all directions if a circular beam stop or a circular pin hole is used instead of the knife edge. These light-shielding methods are known as derivations of the schlieren method.

The photo sensor 106 is arranged on the downstream side of the knife edge 105 set in the optical path of the laser beam 107. The photo sensor 106 converts the intensity of the incident laser beam 107 received thereby into the electrical signal.

To be more specific, a screen 108 is set at 200 mm from the knife edge 105 after passing the knife edge 105, and a schlieren image (an image with uneven brightness) is projected on the screen 108. The screen 108 has a pin hole 109 whose diameter is 0.3 mm. The pin hole 109 allows only a part of the laser beam 107 to pass therethrough so as to limit the measurement region. The diameter of the pin hole 109 directly corresponds to the spatial resolution. The diameter of the pin hole can be changed according to the required spatial resolution. The laser beam 107 passed through the pin hole 109 is incident on the photo sensor 106 (S3071, a high speed photo sensor made by Hamamatsu Photonics K.K.), and the brightness thereof is detected by the photo sensor 106. Incidentally, the sensitivity of the optical system can be changed by changing the focal length f of the convex lens 104.

The data processing system includes an interface 110 that generates brightness data based on the brightness signal outputted by the photo sensor 106, and a data processor 111 connected to the interface 110. Position information of brightness fluctuation measurement points (which is to be described later) is also inputted to the data processor 111. Incidentally, the method for inputting the position information of the brightness fluctuation measurement points is not particularly limited. The position information of the brightness fluctuation measurement points may be manually inputted with a keyboard or the like, or be inputted by providing a predetermined sensor on an optical support 112.

The interface 110 is a known A/D converter.

The data processor 111 acquires the brightness data obtained from the interface 110 and performs predetermined process. In FIG. 1, as an example of the data processor 111, a personal computer having functions both as a means for collecting the brightness data and as a means for analyzing the brightness data is connected. Incidentally, the means for collecting the brightness data may also be accomplished by a digital oscilloscope, instead of the personal computer. Details about the data processor 111 will be described later.

The brightness of the laser beam 107 is measured by measuring each of the brightness fluctuation measurement points for a predetermined time while moving the optical support 112 relative to the supersonic jet 102 in the X-Z plane, and collecting the brightness data. Thus, positional relation of the laser head 103, the convex lens 104, the knife edge 105, the pin hole 109 of the screen 108, and the photo sensor 106 has to be constantly maintained unchanged. In the configuration shown in FIG. 1 (i.e., in the state where the laser beam 107 extends parallel with the ground), it is somewhat difficult to configure the optical support 112. To solve this problem, instead of the optical support 112, a supersonic jet acoustic measurement probe shown in FIG. 2 is configured so that the measurement can be performed in a state where the laser beam 107 extends perpendicular to the ground.

FIG. 2 is a schematic view showing a supersonic acoustic measurement probe (referred to as a "measurement probe" hereinafter) 201 actually used in an experiment.

The supersonic jet 102 flows through substantially the center of a rectangular support frame 202, and the laser head 103 is set on an upper frame 202A of the support frame 202.

A mirror 203 is arranged on a lower frame 202B of the support frame 202 so as to reflect the laser beam 107 at a right angle.

A concave mirror (also called a "converging section") 204 is provided on an edge, which is located on the downstream side of the reflected laser beam 107, of the lower frame 202B to reflect and converge the laser beam 107.

The knife edge 105 is set at the focal position.

Further, the photo sensor 106 is set on the downstream side of knife edge 105.

The optical system has to be moved in a plane perpendicular to the supersonic jet 102 (i.e., an X-Y plane shown in FIG. 2) to perform the measurement.

In the measurement probe 201 shown in FIG. 2, the X-Z plane is a plane parallel to the ground. By moving the measurement probe 201 in the plane parallel to the ground, the measurement position in the X-Z plane can be easily changed.

In contrast, if the device shown in FIG. 1 is tried to be embodied as it is, the optical system has to be moved in the vertical direction, and therefore the device will become large in size or tend to be unstable.

Figure 3:
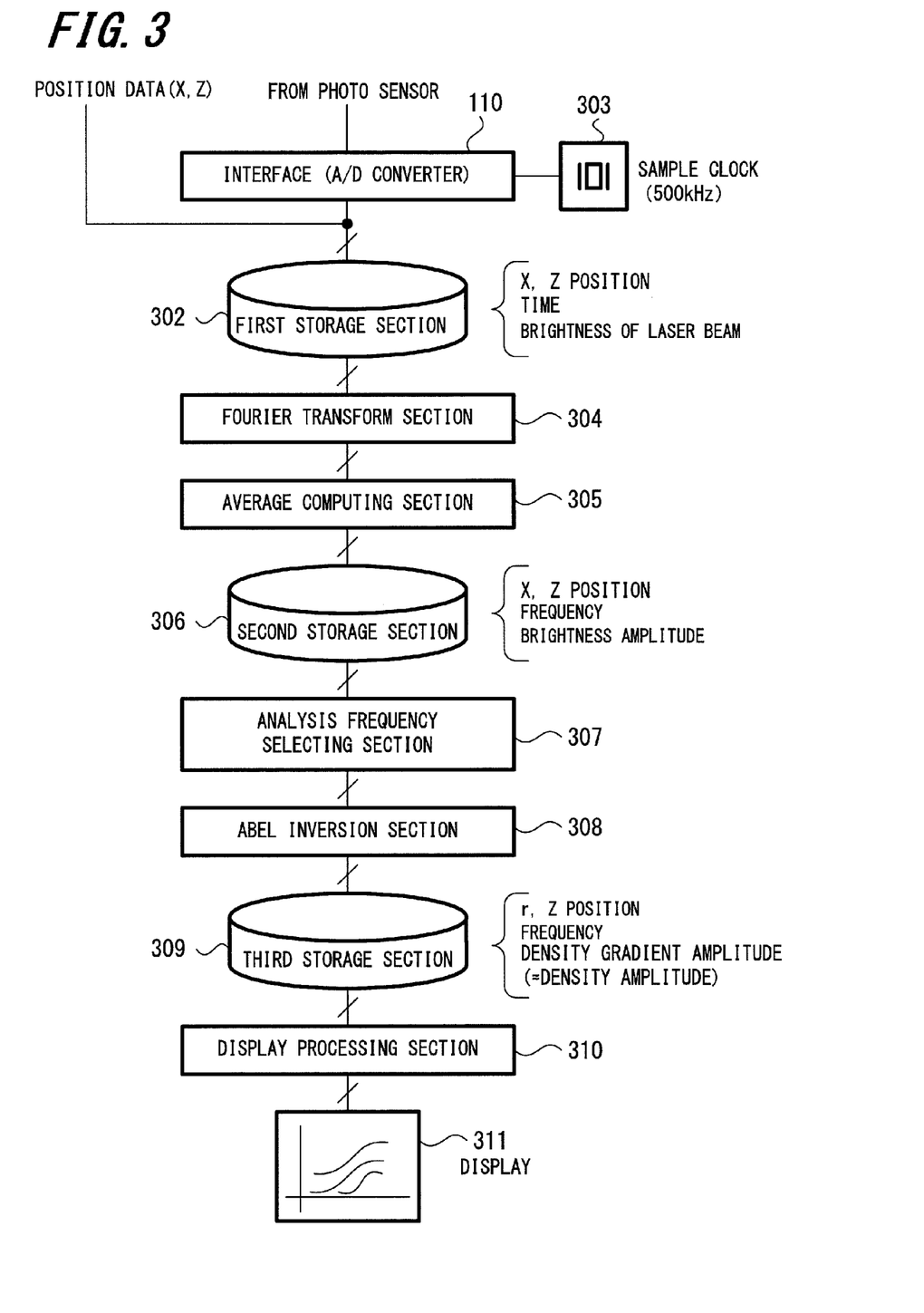
FIG. 3 is a block diagram showing the function of a data processing system of the measurement system.
Figure 4:
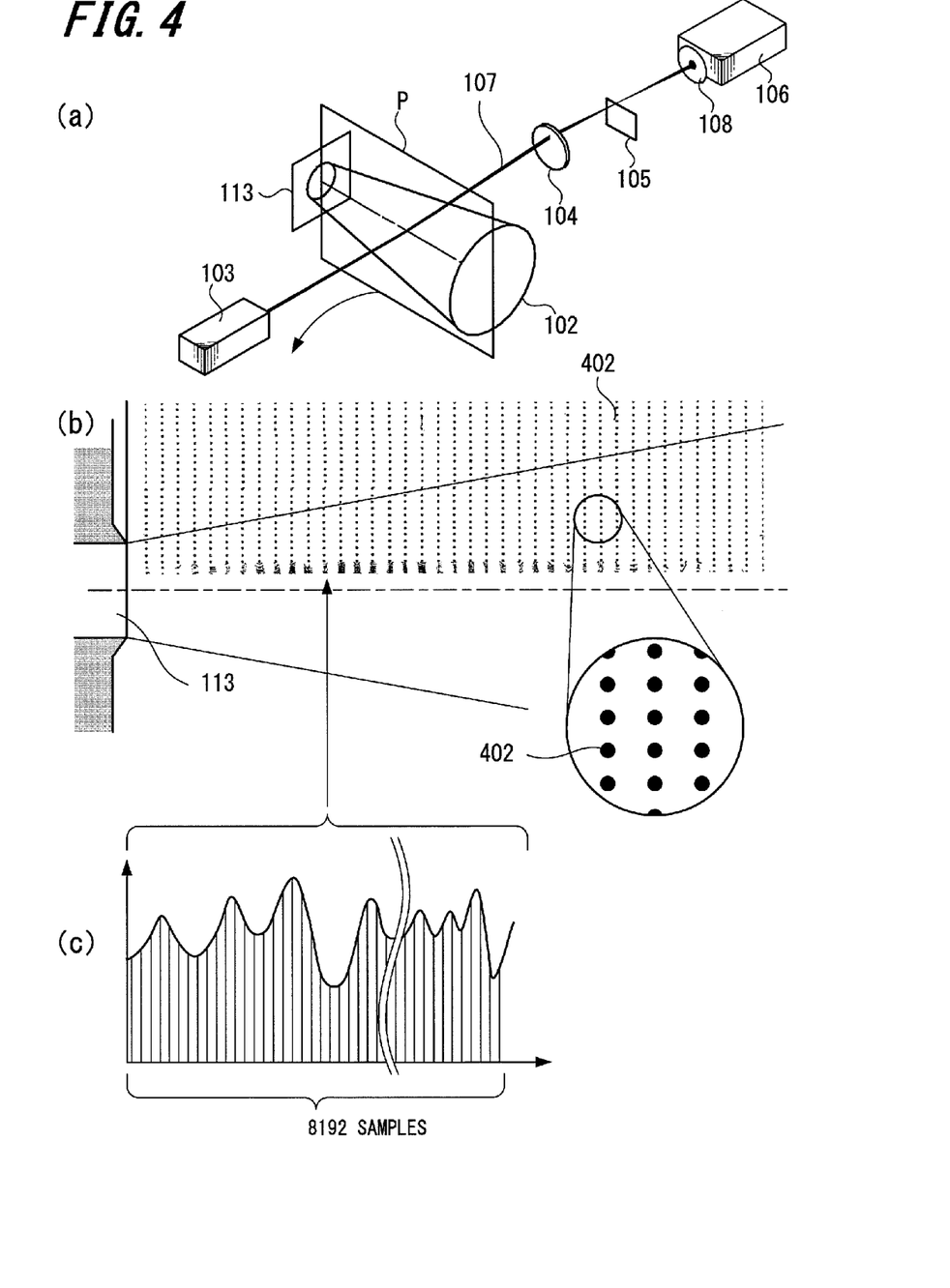
FIG. 4 is a schematic view for describing a measurement model according to the aforesaid embodiment.

FIG. 3 is a block diagram showing the function of the data processing system of the measurement system 101.

The interface 110 converts the signal outputted by the photo sensor 106 into the brightness data (which is a digital value). At this time, a sample clock 303 for acquiring data from the photo sensor 106 is supplied to the interface 110.

The brightness data, along with the positional information of the measurement points, is accumulated in a first storage section 302.

The data accumulated in the first storage section 302 includes "XZ position (positional information within the X-Z plane)", "sampling time" and "brightness value".

As an example, an experiment for taking 8,192 brightness samples is performed for 150 times on a certain XZ position at a sampling frequency of 500 kHz. The sampling is performed for 30 measurement points in an X-direction at an interval of 0.5 mm, i.e., the sampling is performed in a range of 15 mm. The sampling is performed for 39 measurement points in a Z-direction at an interval of 2 mm, i.e., the sampling is performed in a range of 78 mm.

The details of the sampling will be described below.

FIGS. 4(a), 4(b) and 4(c) are schematic views for describing a measurement model according to the aforesaid embodiment.

FIG. 4(a) shows an optical system extracted from the measurement system 101 shown in FIG. 1.

In FIG. 4(a), a vertical virtual plane P is indicated which vertically divides the supersonic jet 102 from the nozzle exit 113.

Intersections of the plane P with the laser beam 107 passed through the plane P are measurement points.

FIG. 4(b) is a view of the plane P seen from the laser head 103.

The individual points in FIG. 4(b) are measurement points 402.

FIG. 4(c) shows a part of the brightness data obtained based on the result of the brightness measurement performed on each of the measurement points 402.

The photo sensor 106 extracts the intensity of the light as a signal.

8,192 pieces of brightness data are obtained for each of the measurement points 402 at a sampling clock of 500 kHz.

As a result, digital data subjected to PCM can be obtained.

Since the obtained data is a pulsating current containing DC component, it is necessary to remove the DC offset before performing the Fourier transform.

Description will be continued below with reference to FIG. 3.

Next, the accumulated brightness data is taken out from the first storage section 302 to be subjected to a process by a Fourier transform section 304. As described above, all the 150 times of 8,192 pieces of brightness data obtained for each of the measurement points 402 are subjected to a transforming process with FFT (Fast Fourier Transform). Thus, data obtained by converting variation on the time axis formed by a brightness data group into the frequency component can be obtained for each of the measurement points 402. Due to the nature of FFT, the number of the inputted samples is equal to the number of the outputted frequency components. In other words, in the case of the experiment of the present embodiment, if 8,192 pieces of sample data is inputted, 8,192 pieces of frequency component data will be obtained. However, according to the sampling theory, actually only 4,096 pieces of frequency component data (i.e., half of the 8,192 pieces of sample data) starting from lower frequency are valid.

Thereafter, an average value of the 150 times of frequency component data for each of the measurement points 402 is obtained by an average computing section 305. This process is performed in order to raise the accuracy of frequency conversion.

The obtained frequency component data is accumulated in a second storage section 306. The accumulated data includes "XZ position", "frequency" and "brightness amplitude".

Figure 6:
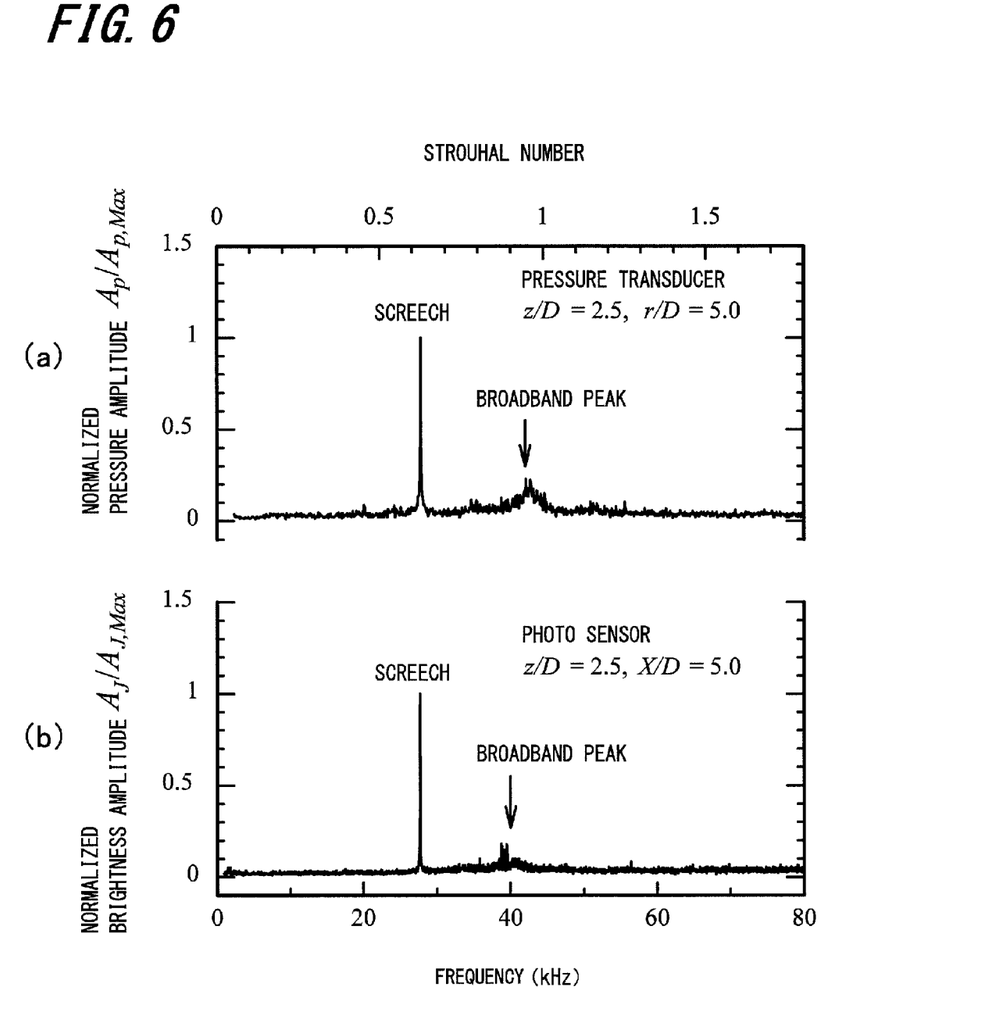
FIG. 6 shows a frequency distribution of a jet noise and a frequency distribution of brightness fluctuation at a given point of a supersonic jet.

At this time, if plotting a graph for each of the measurement points 402, a graph of a frequency distribution shown in FIG. 6(*b*) can be obtained. Incidentally, FIG. 6(*a*) shows a graph of a frequency distribution obtained by measuring the noise of the supersonic jet 102 using a pressure transducer (i.e., a microphone), which is a conventional art for comparison, and performing the Fourier transform on the obtained data.

FIGS. 6(*a*) and 6(*b*) show frequency distributions of the jet noise at a given position of the supersonic jet 102. These frequency distributions are obtained by performing the Fourier transform on the respective measurement results. Incidentally, r represents the distance from the central axis of the supersonic jet, and D represents the diameter (8.0 mm) of the nozzle exit 113. Z represents the distance from the nozzle exit 113 in the Z-axis direction. X represents the distance between the laser beam 107 and the central axis of the jet 102 in the X-axis direction.

FIG. 6(*a*) shows the result obtained using the pressure transducer which is a conventional art. Specifically, FIG. 6(*a*) shows the result obtained by setting the pressure transducer in the vicinity of the supersonic jet 102 (r/D=5.0), and performing the Fourier transform on the obtained pressure data. As mentioned above, the pressure transducer can not be inserted into the supersonic jet 102.

FIG. 6(*b*) shows the result obtained using the schlieren method which is the present embodiment.

As can be known by comparing FIG. 6(*a*) with FIG. 6(*b*), the frequencies at which the screech appears completely match with each other. Further, the frequency regions where the peak of the broadband noise appears are close to each other. Incidentally, a vortex in the shear layer (which is the sound source of the broadband noise) moves along with the flow. Due to the Doppler effect of the moving sound source, the frequency of the broadband noise measured outside the varies according to the measurement position. It can be known by comparing the measurement result obtained using the pressure transducer (which is a conventional art) with the measurement result using the schlieren method of the present embodiment that the difference of the measured frequencies of the broadband noise between the both results is extremely reasonable. Based on the results of these graphs, it can be proved that non-intrusive acoustic measurement can be achieved by using the laser beam and the photo sensor.

Description will be continued again with reference to FIG. 3.

Next, data (i.e., "XZ position", "frequency" and "brightness amplitude") for each of the measurement points 402 is taken out from the second storage section 306, and a frequency needs to be analyzed is selected by an analysis frequency selecting section 307. In other words, the analysis frequency selecting section 307 is a user interface. The selection may be performed using a GUI, or be performed by visually selecting a numerical value.

Figure 7:
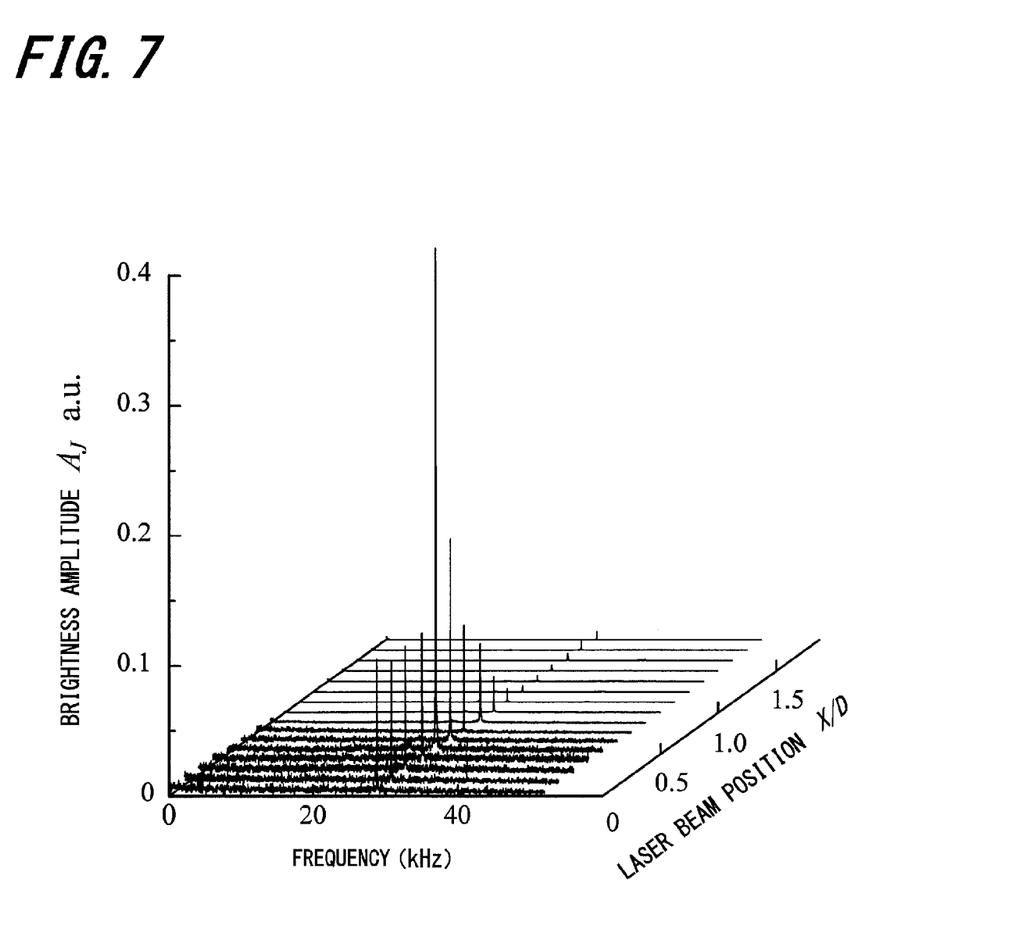
FIG. 7 shows a frequency distribution of the brightness fluctuation caused by the supersonic jet.
Figure 8:
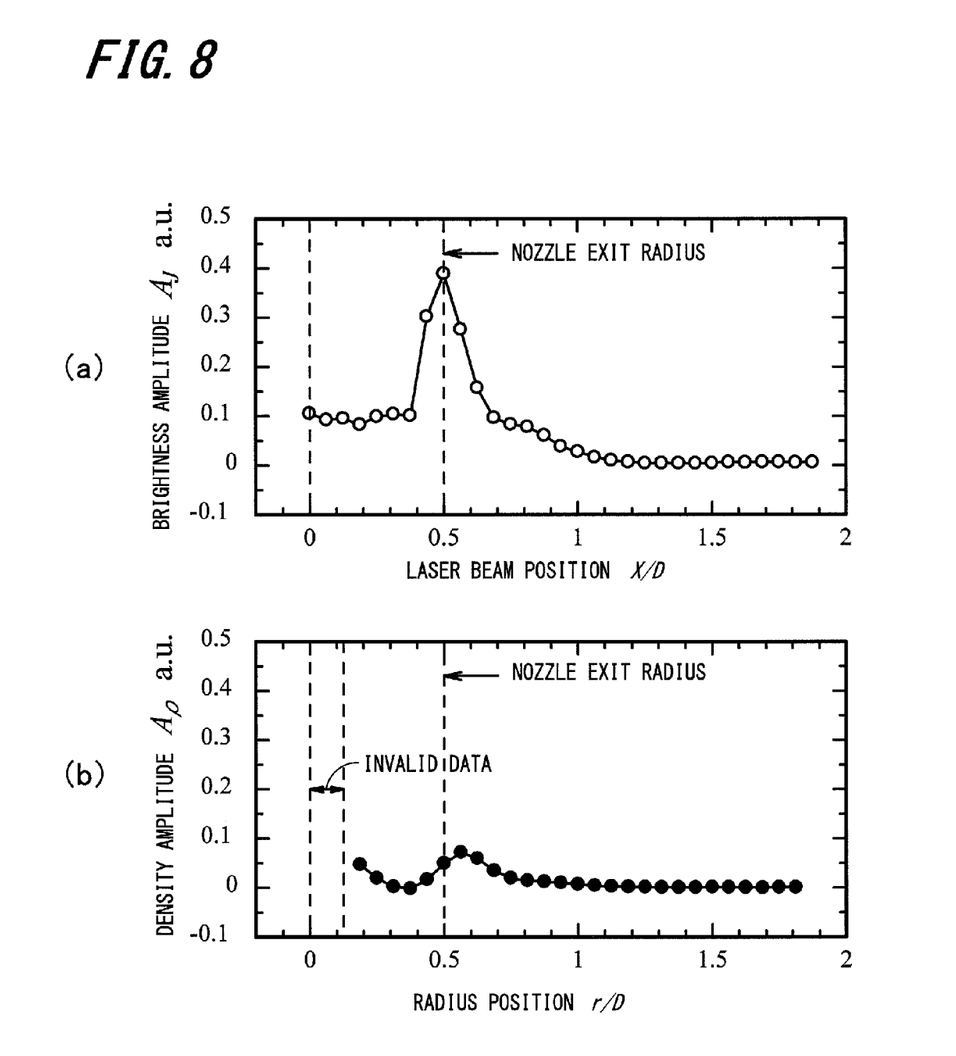
FIG. 8 shows a graph of brightness amplitude of the laser beam and a graph of density amplitude in a radial position of the supersonic jet at screech frequency.

For example, if plotting a graph based on then data of each of the measurement points 402, a graph shown in FIG. 7 can be obtained. In the present embodiment, as an example, a frequency component corresponding to the screech is selected, and analysis is performed on the selected frequency component.

FIG. 7 shows a frequency distribution of the jet noise caused by the supersonic jet 102. The frequency distribution shown in FIG. 7 is a result obtained by performing the Fourier transform on the measurement result of the brightness, and is formed by superposing the results obtained by measuring the measurement points spaced apart from each other in the X-axis direction in a depth direction and visualizing the results. Incidentally, D represents the diameter (8.0 mm) of the nozzle exit 113.

In FIG. 7, the vertical axis represents the brightness amplitude $A_f$, and the horizontal axis represents the frequency. The depth direction represents the position of the laser beam X/D. The measurement position is z/D=2.5 (z=20 mm).

It is known that, at all of the laser beam positions X/D, the peak appears at a frequency of around 28 kHz. The peak appearing at around 28 kHz can be presumed to be the screech. Hereinafter, the peak appearing at around 28 kHz is referred to as a "screech peak". Next, as an example, description will be made focusing on the screech. The broadband noise may also be analyzed following the same procedure.

In a range of 0<X/D<0.5 (i.e., when the laser beam is located inside the jet), not only the screech peak, but also the brightness fluctuation appears across a wide range of frequencies.

When X/D=0.5 (i.e., when the laser beam is located at a position where the distance between the central axis and the laser beam is equal to the radius of the nozzle exit 113), the screech peak becomes the highest, and this position assumedly is the major sound source of the screech.

In a range of 0.5<X/D (i.e., when the laser beam is located outside the jet), it is known that the screech peak gradually decays while the sound wave propagates in the ambient atmosphere.

Based on the above results, it can be proved that, by using the laser beam and the photo sensor, the noise can be continuously measured in a wide region from the inside of the jet to the ambient atmosphere.

Description will be continued again with reference to FIG. 3.

The amplitude value of each of the measurement points 402 associated with the frequency selected by the analysis frequency selecting section 307 is inputted to an Abel inversion section 308 for being processed.

At the selected particular frequency, the Abel inversion section 308 converts the amplitude value data at a certain point Z in the X-direction into the brightness amplitude at the point Z in the radial (r) direction. The Abel inversion is a known numerical analysis technology such as CT scanning.

The data obtained by the Abel inversion section 308 is accumulated in a third storage section 309. The accumulated data includes "frequency", "rZ position" and "density gradient". Incidentally, although the present embodiment is described using an example in which the Abel inversion is performed in an axisymmetric field, the Abel inversion can also be performed in a non-axisymmetric field. In such a case, the accumulated data includes "frequency", "rZθ (angle) position" and "density gradient".

A display processing section 310 takes out the accumulated data (i.e., "frequency", "rZ position" and "density gradient") from the third storage section 309, and displays a graph on a display (a display section) 311. For example, a graphic display function owned by spreadsheet software can be used as a graphic display means.

Incidentally, it is preferred that the first storage section 302, the second storage section 306 and the third storage section 309 are each a non-volatile storage such as a hard disk device. When storing the data in the non-volatile storage, the format of the data is not particularly limited. The format of the data may be a plain text, or a data file created by a spreadsheet software.

Figure 5:
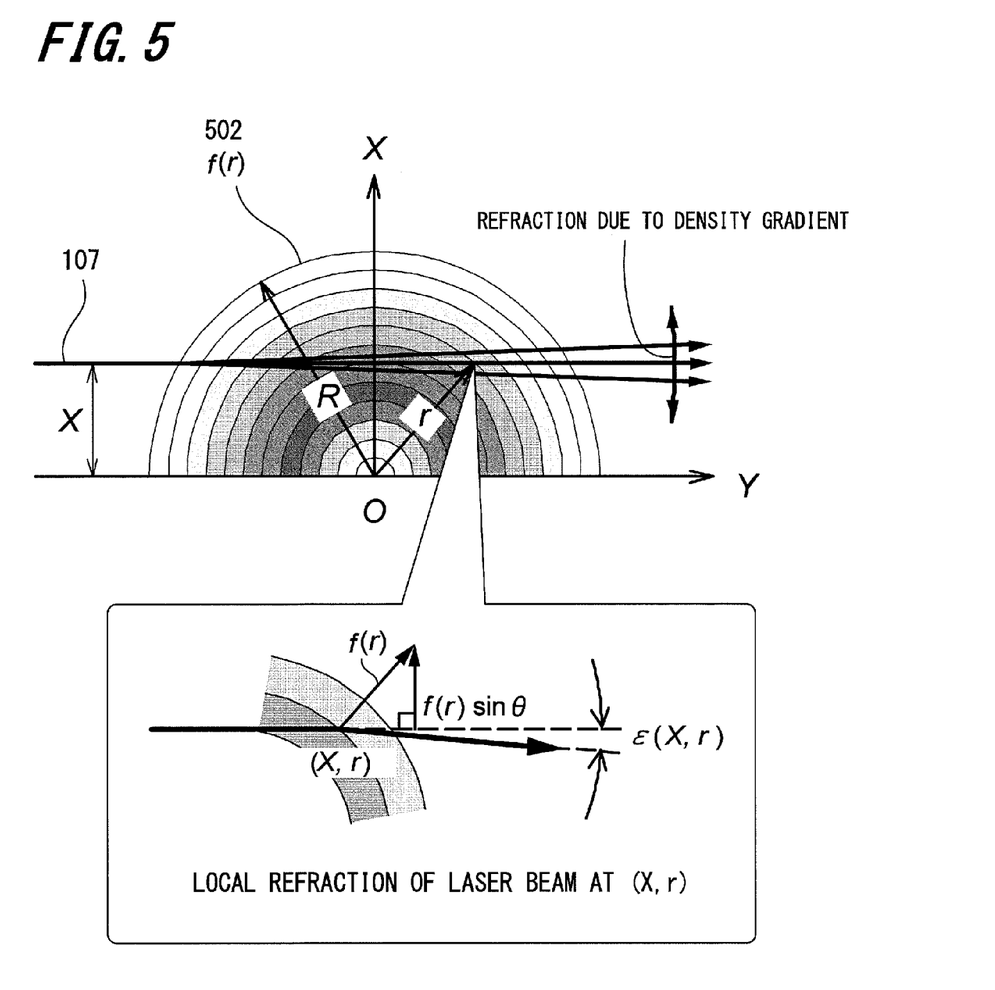
FIG. 5 is a schematic view for explaining the principle of the aforesaid embodiment.

FIG. 5 is a schematic view explaining the refraction principle of the laser beam due to the density gradient of the gas according to the present embodiment.

The laser beam 107 is refracted due to the density gradient 502 caused either by the supersonic jet 102 exists in the optical path or by the sound wave generated by the supersonic jet 102. The refraction principle of the laser beam 107 is similar to a mirage. In other words, the laser beam 107 is refracted due to the variation of refractive index caused by the density difference (i.e., the density gradient) of the jet. However, the refraction principle of the laser beam 107 differs from the mirage in the calculation method of the density gradient 502.

In the case of the mirage, since the ground is warmed by the sun, the density of the air near the ground becomes small, and therefore the density gradient of the air varies vertically. In the case of the present embodiment, the density gradient varies from the center of the supersonic jet in an arc shape. In other words, in order to obtain the refraction angle of the laser beam 107, it is necessary to integrate the arc-shaped density gradient 502.

The center of the supersonic jet is set as the origin O, the traveling direction of the laser beam 107 is set as the Y-axis, and the direction perpendicular to the traveling direction of the laser beam 107 is set as the X-axis. The distance from the origin O is designated as r. The local density gradient at a certain position having a distance r from the origin O (i.e., at a radial position r) is defined by Equation 1.

$$\frac{\partial \rho(r)}{\partial r} \equiv f(r) \tag{1}$$

The local refraction angle of the laser beam 107 is proportional to the local density gradient f(r). A refraction angle ε(X, r) of the laser beam 107 at certain coordinates (X, r) can be expressed by Equation 2.

$$\varepsilon(X, r) = c_1 f(r) \sin\theta = c_1 f(r) \frac{X}{r} \tag{2}$$

where $c_1$ is a constant.

Since the refraction angle ε(X, r) of the laser beam 107 is affected only by the X-axis component of the density gradient 502, the $c_1 f(r)$ needs to be multiplied by sin θ (=X/r). However, the Abel inversion is originally applicable only to a scalar field. Since the Abel inversion can not handle a variable including the vector components, the Abel inversion can not be performed as it is. To solve this problem, in the present embodiment, a variable transform as expressed by Equation 7, which is to be described later, is performed so that an Abel inversion can be applied.

Equation 2 is integrated along the optical path of the laser beam 107 within the range of X<r<R and then multiplied by 2, so that a refraction angle E(X) of the laser beam 107 through the entire optical path is obtained as Equation 3.

$$E(X) = 2 \int_X^R \frac{\varepsilon(X, r) r dr}{(r^2 - X^2)^{1/2}} \tag{3}$$

$$\therefore \frac{E(X)}{X} = 2c_1 \int_X^R \frac{\frac{f(r)}{r} r dr}{(r^2 - X^2)^{1/2}}$$

The brightness variation J(X) of the laser beam 107 at a certain position X detected by the photo sensor 106 is defined as Equation 4.

$$\Delta I(X)/I_0 = J(X) \tag{4}$$

Herein, $I_0$ is the brightness in the case where the laser beam 107 is not refracted. The brightness is an initial value and an intermediate value. This is because, when the refraction occurs, the brightness will change (i.e., the brightness will either increase or decrease). Further, ΔI(X) represents the change in the brightness due to the refraction of the laser beam 107.

Here, J(X) is proportional to the refraction angle E(X) of the laser beam 107 through the entire optical path (see Asanuma, T., A Handbook for Flow Visualization, (1977), Asakura Shoten, Tokyo, pp. 328-341).

$$J(X) \propto E(X) \tag{5}$$

Equation 5 expresses the formula of the schlieren method. The formula tells that the brightness variation is proportional to the refraction angle.

The following Equation 6 can be obtained by rewriting Equation 3 based on Equation 5.

$$\frac{J(X)}{X} = 2c_2 \int_X^R \frac{\frac{f(r)}{r} r dr}{(r^2 - X^2)^{1/2}} \tag{6}$$

where $c_2$ is a constant.

Herein, a variable transform as expressed by the following Equation 7 is performed.

$$\begin{cases} J*(X) = \frac{J(X)}{X} \\ f*(r) = \frac{f(r)}{r} \end{cases} \tag{7}$$

$$(X \neq 0 \quad r \neq 0)$$

By performing the variable transform, the following Equation 8 can be obtained from Equation 7.

$$J*(X) = 2c_2 \int_X^R \frac{f*(r) r dr}{(r^2 - X^2)^{1/2}} \tag{8}$$

Equation 8 is an Abel's integral equation whose kernel is ½. By performing the variable transform expressed by Equation 7, an Abel's integral equation can be derived even for a measurement object containing the vector components, to which a conventional Abel inversion could not be applied. In other words, the Abel inversion can be performed. Equation 8 can be solved analytically as the following Equation 9.

$$f*(r) = -c_3 \frac{1}{\pi r} \frac{d}{dr} \left\{ \int_r^R \frac{J*(X) X dX}{(X^2 - r^2)^{1/2}} \right\} \quad (9)$$

where $c_3$ is a constant.

By use of Equation 9, the local density gradient $f*(r)$ can be re-constructed from the brightness variation $J*(X)$ detected by the photo sensor 106.

As described above, a sound wave is a fluctuation of pressure, and is a nonsteady phenomenon. The handling of nonsteady components will be described below. Hereinafter, all variables are treated as functions of time.

The density gradient $f(r, t)$ at a certain radial position r is expressed by the following Equation 10 as a superposition of various frequency components.

$$f(r,t) = \Sigma A_{f,n}(r) \exp(i\omega_n t) \quad (10)$$

where $A_{f,n}(r)$ is the complex amplitude of the nth frequency component, and $\omega_n$ is the angular frequency of the nth frequency component.

When n=0, the density gradient $f(r, t)$ becomes steady.

In practice, since the fluctuation of the density gradient propagates as a wave in the space, the spatial phase difference at each radial position r needs to be taken into account. Here, for simplicity, it is assumed that the density gradient $f(r, t)$ oscillates with a random phase in each radial position r.

On the other hand, the brightness variation $J(X, t)$ measured by the photo sensor 106 is expressed as the following Equation 11.

$$J(X,t) = \Sigma A_{J,n}(X) \exp(i\omega_n t) \quad (11)$$

where $A_{J,n}(X)$ is the complex amplitude of the nth frequency component, and $\omega_n$ is the angular frequency of the nth frequency component.

When n=0, the brightness variation $J(X, t)$ becomes steady.

Equations 10 and 11 are substituted into Equation 7 and 9, from the linearity of the equations, and the following Equation 12 is obtained.

$$\sum A_{f,n}*(r) = \sum \left[ -c_3 \frac{1}{\pi r} \frac{d}{dr} \left\{ \int_r^R \frac{A_{J,n}*(X) X dX}{(X^2 - r^2)^{1/2}} \right\} \right] \quad (12)$$

By abstracting the nth component from Equation 12, the following Equation 13 can be obtained.

$$A_{f,n}*(r) = -c_3 \frac{1}{\pi r} \frac{d}{dr} \left\{ \int_r^R \frac{A_{J,n}*(X) X dX}{(X^2 - r^2)^{1/2}} \right\} \quad (13)$$

By use of Equation 13, the local density gradient amplitude $A_{f,n}(r)$ can be obtained from the brightness amplitude $A_{J,n}(r)$ measured by the photo sensor 106. Here, in the present embodiment, the density gradient amplitude $A_{f,n}(r)$ is obtained by transforming Equation 13 into a linear matrix equation using the Barr's method (see Yaoita, A., Numerical Methods for the Abel Inversion, The Circulars of the Electrotechnical Laboratory, MITI, 172 (1971), pp. 1-32). Incidentally, the Abel inversion of the discrete value can be achieved by using many methods, instead of being limited to the Barr's method.

By use of Equation 13, the brightness amplitude data can be transformed into the local density gradient amplitude inside and outside the supersonic jet. In other words, it is possible to calculate the amplitude of the fluctuation of the density gradient at a certain spatial point in a wide region ranged from the inside of the supersonic jet to the outside of the supersonic jet. The density of the gas can be obtained by spatially integrating the density gradient. Since each frequency component of the density gradient varies as a sine wave, the density amplitude is proportional to the density gradient amplitude unless under a particular condition. The particular condition means the case where the density gradient amplitude spatially varies rapidly or the like. The following description is made based on an assumption that the density amplitude is proportional to the density gradient amplitude.

FIGS. 8(a) and 8(b) respectively show a graph of the brightness amplitude of the laser beam and a graph of the density amplitude in a radial position of the supersonic jet at the screech frequency.

In FIG. 8(a), the vertical axis represents the brightness amplitude $A_J$, and the horizontal axis represents the laser beam position X/D.

In FIG. 8(b), the vertical axis represents the density amplitude $A_\rho$, and the horizontal axis represents the radial position r/D.

For both FIGS. 8(a) and 8(b), the measurement position is kept at z/D=2.5.

It can be known from FIG. 8(a) that the brightness amplitude $A_J$ is almost constant inside the jet, takes the maximum at a position corresponding to the radius of the nozzle exit 113, and decays monotonously in the ambient atmosphere.

It can be known from FIG. 8(b) that, in a re-constructed tomography, the density amplitude $A_\rho$ reaches large value in the vicinity of the central axis of the jet, increases again and takes the maximum at the position corresponding to the radius of the nozzle exit 113, and decays monotonously in the ambient atmosphere.

According to the present embodiment, it can be proved that the density fluctuation of the gas in a wide region ranged from the inside of the jet to the ambient atmosphere can be measured, which was difficult until now.

Incidentally, the reason why no data exists near the center of the jet is because the variable transform as expressed by Equation 7 is performed, and the solution is indefinite when r/D=0. Further, in the Barr' method used in the present embodiment, in order to stabilize the solution, data interpolation is performed based on data of the two adjacent measurement points. As a result, the measurement results of the three measurement points from the central axis are indefinite.

Such a restriction can be virtually removed by reducing the distance between the measurement points.

Figure 9:
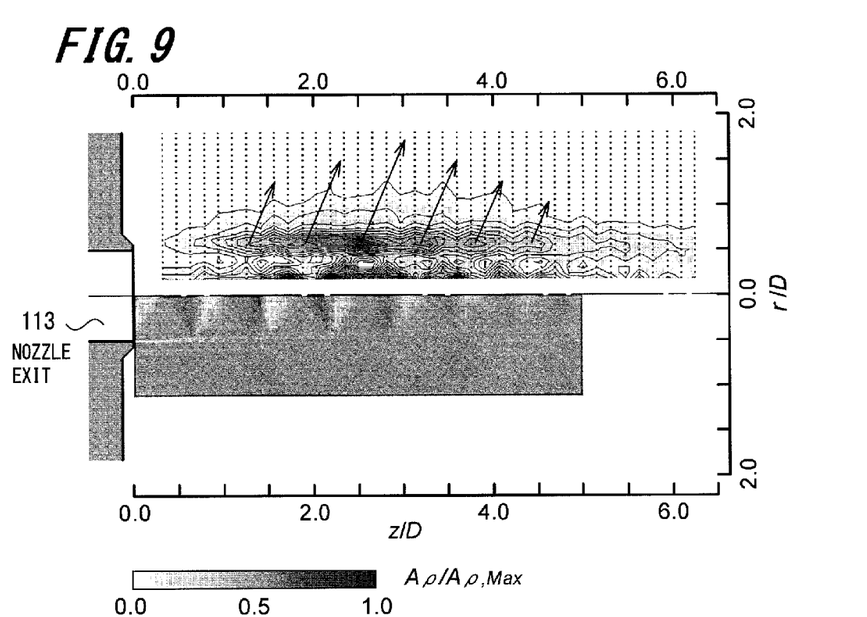
FIG. 9 shows a tomography of the density amplitude of the supersonic jet re-constructed by performing the Abel inversion and a time-averaged schlieren image.
Figure 10:
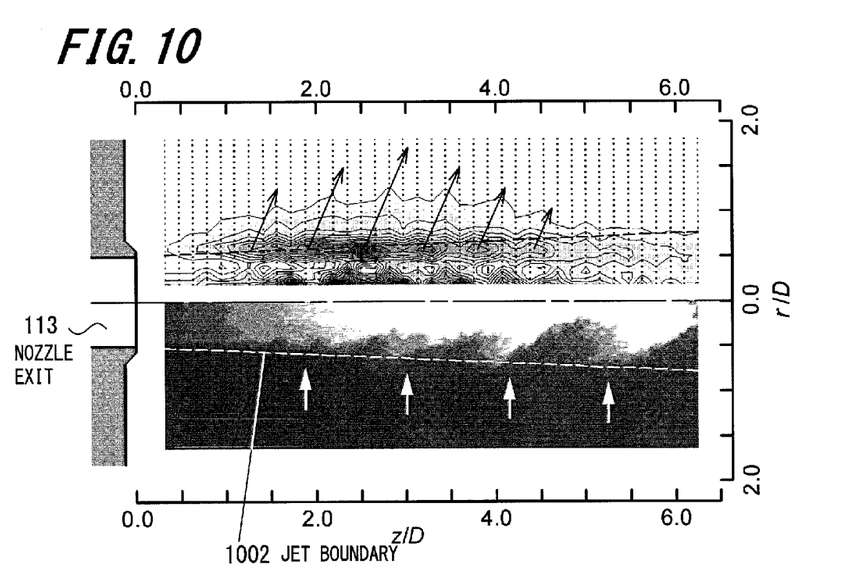
FIG. 10 shows the tomography of the density amplitude of the supersonic jet re-constructed by performing the Abel inversion and an instantaneous Mie scattering image.

FIGS. 9 and 10 are images obtained by visualizing the density gradient amplitude (≈density amplitude) data with the display processing section 310.

The upper part of FIG. 9 shows a tomography of the density amplitude $A_\rho$ of the jet 102 obtained by performing the Abel inversion, and the lower part of FIG. 9 shows a time-averaged schlieren image. The upper part of FIG. 9 is obtained by connecting the points having equal density amplitude $A_\rho$ to form contours as used in maps. The points represent the measurement points.

The lower part of FIG. 9 is an image of the flow of the supersonic jet 102 visualized by using the time-averaged schlieren method.

The image is obtained by mixing ethanol droplets (which are used as scattering particles) into the supersonic jet 102 and photographing the supersonic jet 102 with a continuous xenon lamp and a CCD camera. Incidentally, in the drawings, the supersonic jet 102 flows from left to right.

In the upper part of FIG. 9, regions where the density amplitude takes the maximum are discretely observed in the shear layer between the supersonic jet 102 and the ambient around the supersonic jet 102. Further, it is observed that the fluctuation propagates from these regions along the diagonally downstream direction (as indicated by the arrows in the drawing).

Further, regions where the density amplitude takes the maximum are discretely observed near the central axis of the supersonic jet 102.

In the time-averaged schlieren image of the lower part of FIG. 9, bright regions and dark regions alternately and continuously appear from the nozzle exit 113. The substantially rectangular blocks of the bright regions and dark regions are shock waves called "shock cells". The row structure of the regions where the density amplitude reaches large value shown the upper part of the drawing agrees with the structure of the shock cells shown the lower part of the drawing. Thus, it is considered that traveling shock waves which are periodic distortion of the shock cells due to the passage of the vortex occur. The density amplitude takes the maximum around the 4th shock cell from the nozzle exit 113, and it is considered that the source of the screech exists in this region.

In the present embodiment, the focus is placed on the screech among various elements which cause the jet noise, and only the frequency component of the screech is extracted and subjected to analysis with the analysis frequency selecting section 307 shown in FIG. 3. The result shows that the behavior of the sound source of the screech has deep relation with the shock cells. Additionally, for example, if the focus is placed on the frequency of the broadband noise, and only such a frequency is extracted and subjected to analysis, it is possible to obtain the characteristics of the behavior of the sound source of the broadband noise.

In such a manner, with the present embodiment, the jet noise caused by various frequency components can be analyzed for each component, and which is a great advantage.

As described above, many common features exist the time-averaged schlieren image and the tomography of the density amplitude after performing the Abel inversion. Thus, it is known that extremely accurate measurement result can be obtained by using the measuring method according to the present embodiment.

The upper part of FIG. 10 shows the tomography of the density amplitude obtained by performing the Abel inversion, and the lower part of FIG. 10 shows an instantaneous Mie scattering image of the jet 102.

The upper part of FIG. 10 is identical to the upper part of FIG. 9.

The upper part of FIG. 10 is an image of the flow of the supersonic jet 102 visualized by using a Mie scattering method.

The image is obtained by mixing ethanol droplets (which are used as scattering particles) into the supersonic jet 102 and photographing the supersonic jet 102 with Nd:YAG laser and a CCD camera.

As is known from FIG. 10, the periodic vortices (as indicated by the arrows in the drawing) begin to evolve from near the position of z/D=2.

The periodic vortices distort the shock cells so as to radiate the sound wave.

Part of the sound wave reaches the nozzle exit to become a disturbance source, which is a trigger for the next vortex.

It is considered that such a feed-back loop is a cause of the screech.

The 4th shock cell from the nozzle exit 113 corresponds to the position from which the vortices begin to evolve.

It is known that the vortices grow up enough to distort the shock cells, and become the sound source of the screech.

The present embodiment has the following applications.

(1) By multiplexing the high speed photo sensor, multiple measuring points can be measured at one time in a manner similar to a CCD camera.

The present embodiment discloses a method for non-intrusively measuring the noise caused by the supersonic jet 102 and analyzing the measurement result.

In the present embodiment, by using the laser beam 107, the measurement can be performed on the supersonic jet 102 in a non-intrusive manner. Thus, different from the conventional art, in which a pressure transducer is set in the vicinity of the supersonic jet 102 to directly measure the noise, the turbulence generated when inserting the pressure transducer and the measurement error caused by the turbulence can be eliminated.

Further, different from the conventional art, since analysis can be performed on a particular frequency component through the Fourier transform, the obtained data can be divided into particular frequency components, and based on which more accurate analysis can be achieved.

Although the present embodiment of the present invention is described above, it should be noted that the present invention is not limited to the above embodiments but includes various other modifications and applications without departing from the spirit of the claims of the present invention.

What is claimed is:

1. An acoustic measurement device comprising:
    an optical system in which a light beam is passed through a given measurement point in a jet flow, and a brightness signal obtained by converting the brightness of the light beam into an electrical signal is outputted;
    an interface adapted to convert the brightness signal into brightness data at a predetermined sampling frequency;
    a first storage section for storing the brightness data, sampling time information, and measurement position information associated with the measurement point;
    a Fourier transform section adapted to perform Fourier transform on the sampling time information and the brightness data for each measurement position information to obtain frequency component information and amplitude data;
    a second storage section for storing the measurement position information, the frequency component information and the amplitude data;
    an analysis frequency selecting section adapted to take out the amplitude data associated with a particular frequency component from the frequency component information accumulated in the second storage section;
    an Abel inversion section adapted to convert the amplitude data taken out by the analysis frequency selecting section into density gradient information of the jet flow at a radial position from the center of the jet flow;
    a third storage section for storing radial position information and the density gradient information obtained by the Abel inversion section;

a display processing section for performing visualization processing on the radial position information and the density gradient information accumulated in the third storage section; and a display for displaying the processing result of the display processing section.

2. The acoustic measurement device according to claim 1, wherein the optical system constitutes a schlieren optical system which comprises:
- a laser source;
- a converging section;
- a knife edge;
- a screen having a pin hole; and
- a photo sensor arranged on the screen.

3. The acoustic measurement device according to claim 2, further comprising:
- an average computing section arranged between the Fourier transform section and the second storage section and adapted to obtain an average value of the frequency component information.

4. The acoustic measurement device according to claim 1, wherein the Abel inversion section performs a variable transform in which a brightness fluctuation $J^*(X)$ is obtained by dividing a brightness $J(X)$ by a position X, and a local density gradient $f^*(r)$ is obtained by dividing a local density $f(r)$ by a radius r.

5. An acoustic measurement method comprising:
- a brightness signal obtaining step for passing a laser beam through a given measurement point in a jet flow, and converting variation of refraction state of the laser beam into variation of brightness of laser beam to obtain a brightness signal;
- a brightness data obtaining step for performing data conversion processing on the brightness signal at a predetermined sampling clock to obtain sampling time information and brightness data;
- a brightness data storing step for storing the sampling time information, the brightness data, and measurement position information associated with the position of the measurement point;
- a Fourier transforming step for performing Fourier transform on the sampling time information and the brightness data associated with the measurement position information to obtain frequency component information and amplitude data;
- an amplitude data storing step for storing the measurement position information, the frequency component information and the amplitude data;
- a frequency selecting step for selecting a desired frequency from the frequency component information, and taking out the amplitude data and the measurement position information associated with the selected frequency;
- an Abel inverting step for performing Abel inversion on the amplitude data and the measurement position information associated with the selected frequency to convert the amplitude data and the measurement position information into density gradient information of the jet flow at a radial position from the center of the jet flow;
- a density gradient data storing step for storing the density gradient data of the radial position; and
- a visually displaying step for displaying the density gradient data of the radial position in a visualized manner.

6. The acoustic measurement method according to claim 4, wherein, in the Abel inverting step, a variable transform is performed in which a brightness fluctuation $J^*(X)$ is obtained by dividing a brightness $J(X)$ by a position X, and a local density gradient $f^*(r)$ is obtained by dividing a local density $f(r)$ by a radius r.

* * * * *